United States Patent [19]

Vandersip

[11] 4,083,522
[45] Apr. 11, 1978

[54] SPRING SUPPORT DEVICE

[75] Inventor: Henry A. Vandersip, Cranston, R.I.

[73] Assignee: Corner & Lada Co., Inc., Cranston, R.I.

[21] Appl. No.: 723,043

[22] Filed: Sep. 13, 1976

[51] Int. Cl.² .............................................. F16L 3/00
[52] U.S. Cl. ..................................... 248/54 R; 248/59
[58] Field of Search ................... 248/54 R, 54 CS, 58, 248/59, 358 AA, 18; 267/136, 178; 85/50 A, 51; 24/136 C; 403/344, 375, 371

[56] References Cited

U.S. PATENT DOCUMENTS

| 1,400,372 | 12/1921 | Newton | 267/178 X |
| 1,854,783 | 4/1932 | Cook | 403/371 X |
| 2,420,276 | 5/1947 | Wood | 248/54 R |
| 2,665,128 | 1/1954 | Guffey | 248/54 R |
| 2,729,417 | 1/1956 | Maynard | 248/54 R X |
| 3,102,706 | 9/1963 | Goldsmith | 248/54 R |
| 3,148,870 | 9/1964 | Suozzo | 248/54 R X |
| 3,378,891 | 4/1968 | Metz | 403/371 |
| 4,006,873 | 2/1977 | Berger | 248/54 CS |

FOREIGN PATENT DOCUMENTS

| 1,279,548 | 11/1961 | France | 267/178 |
| 697,987 | 10/1953 | United Kingdom | 248/54 R |
| 820,188 | 9/1959 | United Kingdom | 85/8.8 |
| 1,213,433 | 11/1970 | United Kingdom | 267/136 |

Primary Examiner—Roy D. Frazier
Assistant Examiner—Rodney H. Bonck
Attorney, Agent, or Firm—Salter & Michaelson

[57] ABSTRACT

This invention relates generally to supports and more particularly to a spring support device for supporting piping loads subject to generally vertical movement in use due to changes in operating conditions, such as major changes in temperature. The primary feature of the invention is the utilization of a separable bottom end plate which is mechanically assembled, that is, not integrally connected as by welding, to the support casing. The overall casing including an inwardly extending ring or ledge at the lower end thereof, adapted to hold the separate bottom end plate in assembled condition, can thus not only be disassembled to reuse components thereof, but can be entirely galvanized by hot-dip techniques without the need for weld area touch-up techniques required of prior art constructions that integrally weld-assemble the bottom end plate to the casing.

3 Claims, 8 Drawing Figures

U.S. Patent April 11, 1978 4,083,522
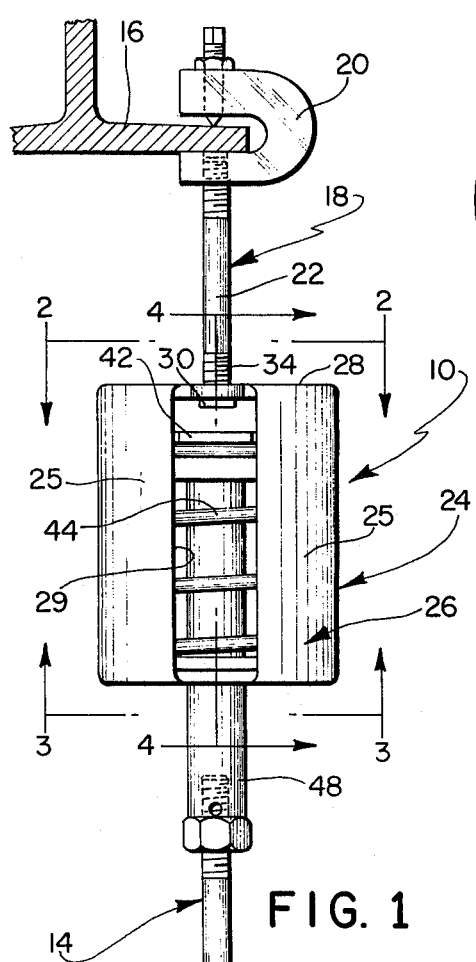
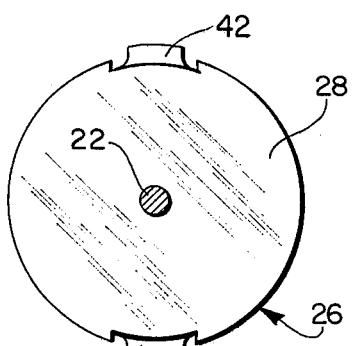
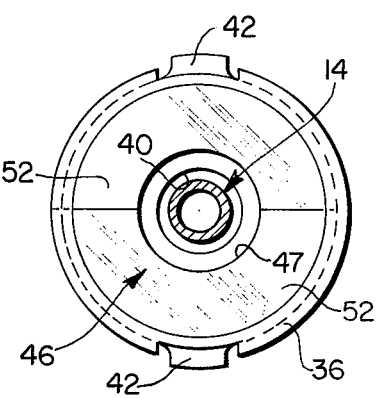
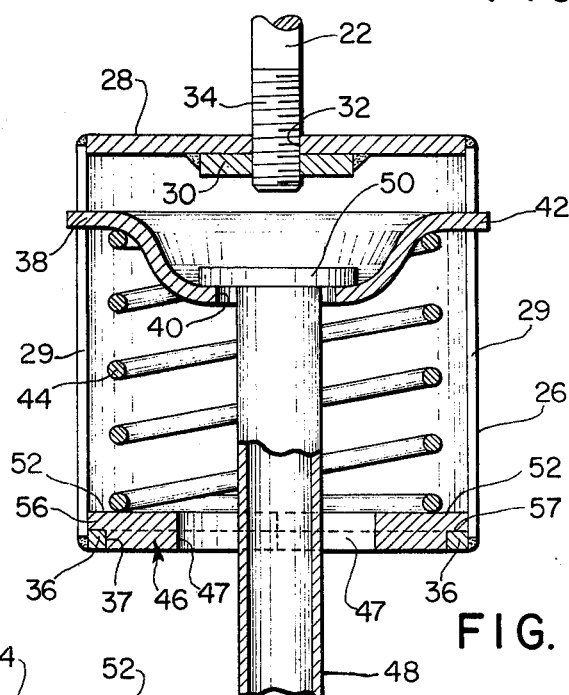
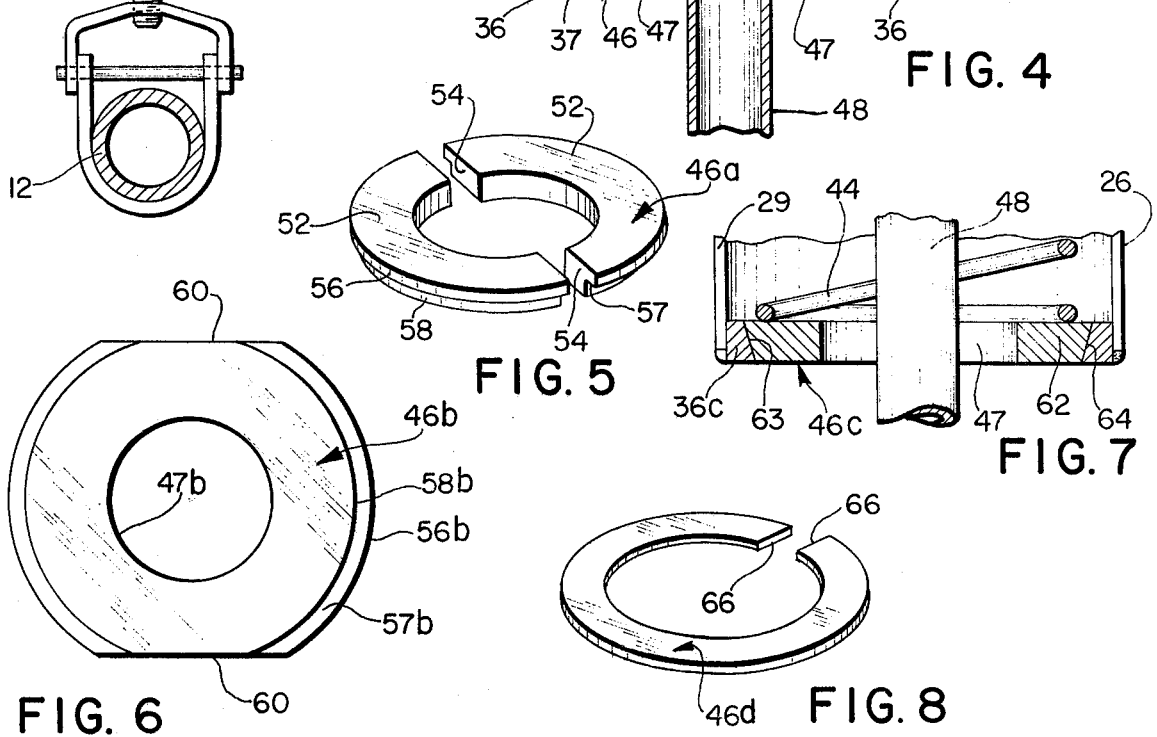
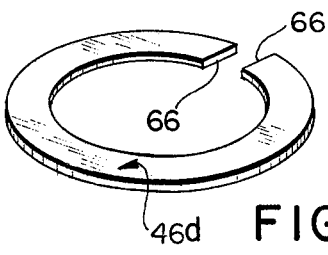

SPRING SUPPORT DEVICE

BACKGROUND OF THE INVENTION

Piping systems such as those used in steam plants require support which takes into consideration the changes in the position of such piping due to thermal differences. Various forms of spring support devices have been developed for this purpose and include those which are positioned beneath the pipe and those which are suspended from an overhead support, so as to in turn support the piping suspended therefrom. The present invention deals with an improved construction utilizable in both such type supports.

Such devices in either form generally utilize a casing or housing having upper and lower end walls to enclose a spring compressed therein. The spring bears at its lower end against the lower end wall and at its upper end engages a spring backing plate movably mounted within the casing. A load bearing assembly which operatively engages the spring backing plate and which is suspended through an opening in either one of the end walls and to which the load i.e., the piping system can be attached completes the general structure of such spring supports. Supports utilizing casings which are typical of the present state of the art are disclosed in U.S. Pat. Nos. 2,936,142 issued May 10, 1960; 3,148,870 issued Sept. 15, 1964, and 3,615,834 issued May 2, 1972. In such supports, a generally cylindrical casing is provided having a first end wall integrally attached thereto, as by welding; thereafter the spring, its backing plate, and portions of the load bearing assembly, as required, are inserted within the thus partially constructed housing; thereupon the second end plate or wall is welded in position so as to completely and permanently enclose the structure. Accordingly, if it is desirable to re-utilize the device with a spring of a different load capacity or even recycle some of the component parts thereof, such is not readily possible due to the integrally welded closed structure of such known devices. It would accordingly be desirable if spring support devices of this nature could be assembled in such a manner that they could at least be partially disassembled so that the housing portion thereof could be utilized with a different capacity spring or so that the component parts thereof could be re-cycled.

Another serious drawback of the prior art devices of this nature is that they are difficult to protect from rust or other corrosion when utilized in certain commercial environments. Presently such supports are protected by a two-step galvanization procedure wherein the partially enclosed casing is initially galvanized by hot dipping; then, after subsequently welding on the bottom plate, a touchup galvanizing procedure is performed, normally by cold blasting techniques.

Thus, two semicylindrical sides comprising the housing, along with the top cap or end plate thereof, are placed in a welding fixture and welded together to form the partially completed casing assembly which is then provided with an overall protective galvanized coating by standard hot dip techniques. The spring plate and other internal portions such as the load bearing assembly and the other end plate thereof are similarly provided with a hot-dip galvanized coating. The spring, spring plate and portions of the load bearing assembly, as appropriate for the type device, are then assembled within the thus partially completed casing. The spring is then placed under compression by hooks acting thereon through slots provided in the cylindrical wall of the casing so as to draw the spring down away from the open end of the casing. After preparation of the bottom end of the housing, as by removal through blasting techniques of portions of the galvanized coating, the bottom end plate is welded thereto taking care that the heat utilized therein does not destroy any corrosion protective coating on the spring or otherwise change the characteristics thereof. It is thereafter necessary to tough up those welded areas with a protective coating, as by cold galvanizing techniques wherein the metal is projected in a molten condition against the unprotected surfaces, inasmuch as hot-dip techniques cannot be utilized since there will be no practical way to mask the spring.

The above repair process does, however, require masking the spring so that its protective coating, i.e., neoprene, will not be removed in areas coming in contact with the metal flow. This presently used procedure is not only time consuming and expensive but furthermore cannot provide the best possible corrosion protection inasmuch as areas adjacent to the weld area internally disposed within the casing cannot be reached with such repair galvanizing techniques nor is it possible to insure the application of an even protective repair coating to the secondary weld external surfaces. Accordingly it would be particularly desirable to provide a spring support device constructed so that all metal areas thereof may receive an even application of the superior hot-dip galvanized coating without subjecting the spring or its protective coating to the adverse consequences of prior art construction and assembly techniques.

SUMMARY OF THE INVENTION

The present invention accomplishes these above indicated major aims while avoiding those prior shortcomings indicated by the provision of a spring support device comprising a casing, at least partially closed at a first end thereof by an end plate integrally secured thereto, a compressible spring positioned within said casing between said first end and a second end opposite thereto, said second casing end having an integrally secured ledge inwardly extending from the periphery thereof and a second end plate assembly separate from said casing and having at least outer peripheral portions thereof disposed in abutting relationship with said ledge and held thereagainst by action of said spring.

It is, therefore, a primary object of the instant invention to provide a spring support device which may be partially disassembled to provide access to the spring and other internal component parts for reutilization thereof.

Another primary object of this invention is the provision of a spring support device and its method of assembly which enable improved corrosion resistant coatings to be applied therearound without the need of the application repair coating techniques.

A further object of the invention is the provision of a spring support housing wherein the bottom plate thereof comprises an assembly which is separable from the other components of the housing and is mechanically held in position therein against inwardly extending ring or ledge.

Still another object of the invention is the provision of a spring support device as indicated immediately above wherein the bottom end plate assembly is made up of separate components which are assembled into the housing by passing them through an opening provided at the bottom end of the housing.

A still further object of the invention includes the provision of alternate methods of assembling the spring support device of the present invention so that the end plate assembly thereof may be installed within the housing in various improved manners.

Other objects, features, and advantages of the invention will become apparent when the description thereof proceeds when considered in connection to accompanying illustrative drawing.

DESCRIPTION OF THE DRAWING

In the drawing which illustrates the best mode presently contemplated for carrying out the present invention:

FIG. 1 is an elevational view of a spring support device of the hanging or suspension type which shows the overall manner in which the present invention is utilized;

FIG. 2 is a top sectional view thereof taken along the line 2—2 of FIG. 1;

FIG. 3 is a further sectional view thereof taken along the line 3—3 of FIG. 1;

FIG. 4 is a side sectional view taken along the line 4—4 of FIG. 1 and shows in particular one manner in which the end plate assembly of the present device is maintained in position;

FIG. 5 is a perspective view of the separate split ring segments which may comprise the bottom end plate assembly shown in FIG. 4;

FIG. 6 is a plan view of a modified form of bottom end plate assembly;

FIG. 7 is a sectional view similar to FIG. 4 of the drawing showing a further embodiment wherein the bottom end plate assembly comprises separate split rings adapted for wedging position with the housing thereof; and FIG. 8 is a still further alternate embodiment of the bottom plate assembly wherein such comprises a single split ring which is radially compressible.

DESCRIPTION OF THE INVENTION

A spring support device 10 of the hanging type is depicted as supporting piping 12 from a suitable load carrying assembly or means 14 and in turn supported from a fixed upper support 16 by means of a suspension mechanism 18 including a clamp 20 and an adjustable threaded rod 22 for receipt into the top cap or first end plate of the support, as will hereinafter be more fully apparent. The support 10 includes a generally cylindrical split casing 24 generally having partially cylindrical housing halves 25 forming a housing 26, positioned in spaced opposition to each other and thus forming side slots 29 by means of a first end plate or top cap 28 integrally welded thereto. Such first end plate is further provided with a reinforcing boss or collar 30 integrally attached to the bottom thereof as by welding. Both the plate 28 and the collar 30 are provided with an internally threaded bore 32 for receipt of the threaded end 34 of the suspension rod 22 and in this manner enables the spring support device 10 to be suspended from a fixed overhead support 16 and adjustable in relationship thereto, as it is known in the art.

The remaining second end of the housing 26 is provided with an inwardly extending ring or ledge 36, which generally is integrally secured to the housing 24 by means of welding but which may be positioned therein by means of a bottom flange to which such ledge is in turn integrally connected in those types of bottom support hanger constructions generally referred to a Type F in the trade. The housing 26, the first integral end plate 28 and the annular ledge 36 form the casing 24 prior to its receipt of the internal working components of the support device 10. As will more clearly hereinafter be brought out, all welding upon the device 10 is completed at this stage and all further assembly is mechanical. This then enables the casing unit 24 as above described to be prepared for receipt of a protective metal coating, such as zinc, by a hot galvanizing dip, which assures complete protection thereof since all surfaces thereof are accessible and since no further welding steps with their subsequent repair procedures are required. This then comprises a major advantage of the present construction and its assembly method over those heretofore available.

A dish-like spring plate 38 having a central opening 40 and outwardly projecting ears 42 is positioned within the casing 24 proximal to the first end plate 28. In such position the outwardly projecting ears 42 are free to ride up and down in the diametrically opposed slots 29 provided in the housing 26 so as to prevent any rotation of the spring or plate 28 and to assure even bearing of the compression spring 44, positioned within the casing 24 between the separable second end bottom end plate 46 and plate 38, as will hereinafter be more fully described. Extending into housing 26 from its lower end is a rod portion 48 of the load bearing assemby 14, having a headed member 50 making engagement with the spring plate 38. The headed member 50 and the rod 48 are positioned behind the vertically movable spring plate 38 and the rod portions 48 thereof projects through the opening 40 therein, through the central portions of the spring 44 and outwardly of the unit 10 by projection through an opening 47 in the second end plate assembly 46.

It should be noted that the inwardly radial extent of ledge 36 is relatively slight inasmuch as it defines a large or extensive central opening 37 in the casing 24 of a diameter equal to or slightly larger than the outside diameter of the spring 44, so that the spring can be easily assembled within housing 26 by passing it through opening 37. Also, although the spring plate 38 has a radial extent greater than the opening 37, the plate 38 can be positioned within the casing 24 by tipping one side thereof into the casing past the ledge 36 in such a position that one of the ears 42 projects through one of the slots 29 and part-way along the longitudinal extent of such slot, and thereafter working the plate 38 past the ledge 36 into its final position proximal to the first end plate 28. Alternatively, the spring plate can be inserted edgewise through one of the slots 29 when the longitudinal extent of such permits. In both such cases, placement of the spring plate 38 is prior to the insertion of the spring 44 into the casing 24. Placement of the rod 48 is accomplished either by its preassembly with spring plate 38 or progressively working its headed member 50 through the opening 40. The above described placement procedures are accomplished as above indicated and then the spring is first inserted and then compressed as by the grasping of the bottom edges of the spring 44 and longitudinally compressing such within the casing 24 towards the first or top end plate 28 by means of known fixtures designed for this purpose. In this manner then, the spring is temporarily removed from the lower end of the casing 24 and enables such to receive the bottom or second and separable end plate assembly 46. Thereafter, when the retraction force is released from the spring, the spring engages the top surface of the second end plate assembly 46 radially inward of the ledge 36 and thus assures its tight engagement against the ledge 36 and thus its retention within the casting 24.

Turning now to FIGS. 4–8 of the drawing, various forms or embodiments which the separable bottom or second end plate 46 assembly can take are depicted. Thus in FIG. 5 a second end plate 46 assembly 46a is depicted wherein such is formed by a plurality, usually two, separate split ring segments 52 each having edge surfaces 54 adapted for face-to-face contact with each other when positioned within the casing 24. Each segment 52 as depicted includes a first peripheral face 56 adapted for proximal or contacting relation with inside portions of the housing 26, an inner peripheral surface or step 57, and a second reduced outer peripheral face 58 adapted to contact inner radial surfaces 37 of the ledge 36. It should also be brought out that in such embodiment as shown in FIG. 5 that the second or reduced face 58 may be omitted and retention of the ring 52 accomplished by the interaction between upper surfaces of the ledge 36 and the inner peripheral surface 57 of the ring 52.

In this embodiment the upper surfaces of the second end plate assembly 46a are adapted to receive lower portions of the spring 44 in bearing engagement thereagainst so as to force end plate 46a against the ledge 36 and accordingly positively position such therein, as depicted. It should be noted that in this embodiment, as with the others depicted, further vertical movement of the spring plate 38 brought about by increased loads applied to the load bearing means 14 will serve to increase the pressure and, therefore, the positioning force maintaining such second end plate 46 in place. As above explained, the positioning of the segments 52 in casing 24 is accomplished when the spring is in a retracted position where there is accordingly a certain amount of open space in the bottom end of the casing 24, so that each segment 52 can be inserted through the relatively extensive opening 37, and then positioned so that the step 57 formed between the peripheral faces 56 and 58 is retained in back of the abutment formed by the ledge or ring 36.

A similar holding action is accomplished by means of the embodiment shown in FIG. 6 of the drawing, wherein an integral one-piece nonsegmented bottom or second end plate 46b is depicted as having a central opening 47b and including similar first and second outer peripheral faces 56b and 58b respectively and having a ledge 57b defined therebetween for abutting contact with the ledge 36. With the nonsegmented second end plate 46b, the positioning within the casing is through one of the side slots 29 in edgewise position and is only applicable with those cases where the longitudinal length of casing 24 will permit such insertion; however, the effective diameter of such end plate 46 may be reduced by removing portions thereof to form opposed chordal sections 60. After such insertion, the end plate 46b is similarly held in place by the bearing force of the spring 44. The reduced outer face 58 may, as previously explained in reference to FIG. 5, be omitted in this one-piece configuration of the end plate.

A further modified end plate assembly is illustrated as 46c in FIG. 7 of the drawing. Therein a ring 36c having downwardly outwardly wedge-shaped inner peripheral configuration 63 is utilized in conjunction with segments 62, each having an outer peripheral face of a cooperating wedge-shaped configuration 64 so that when the segments 62 are positioned within the casing in a manner similar to the segments 52, the action of the spring 44, when directed thereagainst, forces such cooperating wedge-shaped surfaces 63 and 64 respectively into tight engagement with each other. Also, the end plate 46c may otherwise be of nonsegmented, that is, of one-piece construction, and in such cases positioning within the casing would be through side slots 29 as indicated in reference to the FIG. 6 embodiment.

A further alternate embodiment of the invention is depicted in FIG. 8 of the drawing wherein a nonsegmented end plate 46d of split ring configuration is shown. The split ring end plate 46d is of a radial width or thickness so that it may be supported behind the ledge or ring 36 and still provide an adequate upper surface area upon which the spring 44 may act so as to force such split ring 46d into its retained position within the casing. The access of such split ring 46d through the opening 37 is accomplished by compressing same to a reduced diameter by flexibly moving the edge faces 66 thereof past one another, which is possible due to the flexible nature of the ring, and once past the ledge or ring 36, and within the confines of the casing 24, permitting the ring 46d to expand outwardly to its normal size whereby it will be retained by ledge 36.

It is accordingly believed that construction and method of assembly for a novel spring support has been disclosed wherein a second end plate 46 thereof can be removed when the spring compression force thereagainst is temporarily removed, so that the replacement and reuse of internal parts thereof is now possible, whereas prior art constructions demanded the replacement of the entire unit. It is also possible, by the provision of mechanically closing the casing structure 24 by means of the nonintegral second end plate 46, that increased integrity of the rubber or other protective coating to the spring as well as an enhanced overall corrosion resistance to the metal parts of the unit can be achieved, as well as the other objects set forth previously. Also, while the provisions of the present invention have been particularly described by reference to a hanging spring support, the features of the invention are equally applicable to those units which support their load from positions therebeneath. In such latter cases, the load bearing means 14 would be alternatively positioned above the spring plate 38 and usually attached thereto, as by welding, and provision made through the first or upper end plate 28 for the projection of a rod or casing similar to rod means 48.

While there is shown and described herein certain specific structure embodying the invention, it will be manifest to those skilled in the art that various modifications of the parts may be made without departing from the spirit and scope of the underlying inventive concept and that the same is not limited to the particular forms herein shown and described except insofar as indicated by the scope of the appended claims.

What is claimed is:

1. A spring support device adapted to support installed piping and similar loads which are movable over a range of travel during changes in operating conditions thereof, comprising a casing having generally closed side walls, at least partially closed at a first end thereof by an end plate secured thereto, a generally open second end opposite thereto, a compressible spring positioned within said casing between said first end and said second end, ledge integrally secured to said casing at said second casing end and inwardly extending from the periphery thereof, and a second end plate assembly separate from said casing and having peripheral portions thereof disposed in abutting relationship with said ledge and held thereagainst by action of said spring, said ledge defining an extensive second end central opening at least as great as the outer diameter of said spring so as to permit passage of said spring into said casing during assembly of said support, said ledge having contiguous first upper and second inner substantially flat surfaces, said second end plate assembly comprising separate generally planar split ring segments, each segment individually positionable within said casing by passage through said extensive second end central opening, said split ring segments having their inner terminal edge surfaces in face to face position with each other, said segments having a first outer peripheral face in abutting frictional contact with said first upper surface of said ledge and a second outer peripheral face in abutting friction contact with said second inner surface of said ledge.

2. The spring support device defined in claim 1, said split ring segments each being of semi-circular configuration.

3. The spring support defined in claim 1, said inner and outer peripheral faces of said segments defining a substantially right angle step and said first and second ledge surfaces defining a similar substantially right angle step, said steps adapted for mutual receipt of each other.

* * * * *